United States Patent
Lee et al.

(10) Patent No.: US 6,769,922 B1
(45) Date of Patent: Aug. 3, 2004

(54) AUXILLARY CONNECTORS FOR CONNECTORS OF LIQUID CRYSTAL DISPLAY DEVICE

(75) Inventors: Kyong-rak Lee, Kumi-shi (KR); Eun-Yeong An, Kumi-shi (KR)

(73) Assignee: L.G. Philips LCD Co., Ltd, Seoul (KR)

( * ) Notice: Subject to any disclaimer, the term of this patent is extended or adjusted under 35 U.S.C. 154(b) by 0 days.

(21) Appl. No.: 09/665,115

(22) Filed: Sep. 20, 2000

(30) Foreign Application Priority Data

Sep. 20, 1999 (KR) ........................................ 1999-40356

(51) Int. Cl.⁷ .............................................. H01R 9/09
(52) U.S. Cl. ...................................................... 439/74
(58) Field of Search ............................ 439/638, 74, 75

(56) References Cited

U.S. PATENT DOCUMENTS

| | | | |
|---|---|---|---|
| 5,064,389 A | * | 11/1991 | Klien et al. ................... 439/74 |
| 5,137,462 A | * | 8/1992 | Casey et al. .................. 439/74 |
| 5,181,855 A | * | 1/1993 | Mousquera et al. .......... 439/74 |

FOREIGN PATENT DOCUMENTS

| | | | |
|---|---|---|---|
| DE | WO-92/17921 | * 10/1992 | ................ 439/630 |

* cited by examiner

Primary Examiner—Tulsidas Patel
Assistant Examiner—Phuong Dinh
(74) Attorney, Agent, or Firm—McKenna Long & Aldridge LLP

(57) ABSTRACT

Disclosed is an auxiliary electric connector used for coupling a male connector connected to a first substrate of a liquid crystal display device and a female connector connected to a second substrate spaced apart from the first substrate, the male connector having convex portions, the femail connector having concave portions, including: a first end portion having the same shape as the convex portion of the male connector; and a second end portion having the same shape as the concave portion of the female connector. The male and female connectors may be connected to the first and second subtrates of the liquid crystal display device with a cable and the cable has a plurality of electric wires, respectively. The cable can be a flexible printed cable. The male and female connectors may directly contact the first and second subtrates of the liquid crystal display device, respectively. The inventive auxiliary connector can compensate for the distance between the first and second substrates of the liquid crystal display device.

16 Claims, 7 Drawing Sheets

AUXILLARY CONNECTORS FOR CONNECTORS OF LIQUID CRYSTAL DISPLAY DEVICE

CROSS REFERENCE

This application claims the benefit of Korean Patent Application No.1999-0040356, filed on Sep. 20, 1999, under 35 U.S.C. §119, the entirety of which is hereby incorporated by reference.

BACKGROUND OF THE INVENTION

1. Field of the Invention

The present invention relates to an auxiliary connector of a liquid crystal display device, more particularly, to the auxiliary connector that connects a pair of connectors or flexible printed circuit cable connectors (FPC connectors) of the liquid crystal display device.

2. Description of Related Art

A liquid crystal display device conventionally employs first and second substrates, each having a patterned metal layer. In order to connect the patterned metal layers of the two substrates electrically, or to apply signals to the patterned metal layers, connectors and flexible printed circuit cables are attached to the two substrates.

Referring to FIGS. 1, 2A and 2B, a pair of the conventional connectors employed for the liquid crystal display device will be explained.

Each of the first and second substrates 10 and 12 has the patterned metal layer (not shown) on the opposite surface to each other. A first connector 14 is attached to the patterned surface of the first substrate 10, and a second connector 16 is attached to that of the second substrate 12.

One of the connectors, for example, the first connector 14 is a female connector having a concave portion 14a and a plurality of contact holes 14b. The other connector, the second connector 16 is a male connector having a convex portion 16a and a plurality of contact pins 16b. In order to connect the first and second connectors 14 and 16 electrically and physically, the convex portion 16a of the second connector 16 is inserted into the concave portion 14a of the first connector 14. At the same time, each of the contact pins 16b of the second connector 16 is also inserted into the corresponding contact hole 14b of the first connector 14.

Not shown in Figs, inside the first and second connectors 14 and 16, a plurality of electric wires are arranged so that each of the electric wires is electrically connected with the corresponding contact hole 14a or contact pin 16a. Thus, when the contact pin 16a of the second connector 16 is inserted into the contact hole 14a of the first connector 14, the two connectors are electrically connected.

For the sake of lower material cost, standardized connectors are preferred. But, when the distance between the two opposite surfaces of the first and second substrates changes due to a modified design, the connectors should be also changed in size correspondingly. For example, as shown in FIG. 3A, an addition of a device 18 according to the modified design elongates the distance between the first and second substrates 12 and 14 so that the first and second connectors 14 and 16 can not be connected properly.

For the above-mentioned case, as shown in FIG. 3B, cables or flexible printed circuit cables are employed to cover the change in distance between the two substrates. Namely, a first connector cable 11 electrically connects patterned metal layer of the first substrate 10 and the first connector 14, and a second connector cable 13 electrically connects the patterned metal layer of the second substrate 12 and the second connector 16.

However, the application of the first and second connector cables 11 and 13 decreases the endurance of the liquid crystal display device.

That is to say, when a vibration or an impact affects the liquid crystal display device, the coupled connectors 14 and 16, which are respectively connected to the first and second substrates 10 and 12 by way of the first and second connector cables 11 and 13, also vibrate or shake. The vibration or shake of the connectors causes a breaking of the cables or a collision between the connectors and adjacent devices.

Further, since the cable-connected connectors can not support the two substrates of the liquid crystal display device, the liquid crystal display device becomes weaker under the impact.

SUMMARY OF THE INVENTION

In view of the foregoing and other problems of the conventional connector cables for the connectors of the liquid crystal display device, it is an object of the present invention to provide an auxiliary connector that substitutes for the connector cables connecting the connectors with substrates.

To achieve the above-mentioned objects, the present invention provides an auxiliary electric connector used for coupling a male connector connected to a first substrate of a liquid crystal display device and a female connector connected to a second substrate spaced apart from the first substrate, the male connector having convex portions, the femail connector having concave portions, including: a first end portion having the same shape as the convex portion of the male connector; and a second end portion having the same shape as the concave portion of the female connector.

The male and female connectors may be connected to the first and second subtrates of the liquid crystal display device with a cable and the cable has a plurality of electric wires, respectively.

The cable can be a flexible printed cable.

The male and female connectors may directly contact the first and second subtrates of the liquid crystal display device, respectively.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Figure 4:
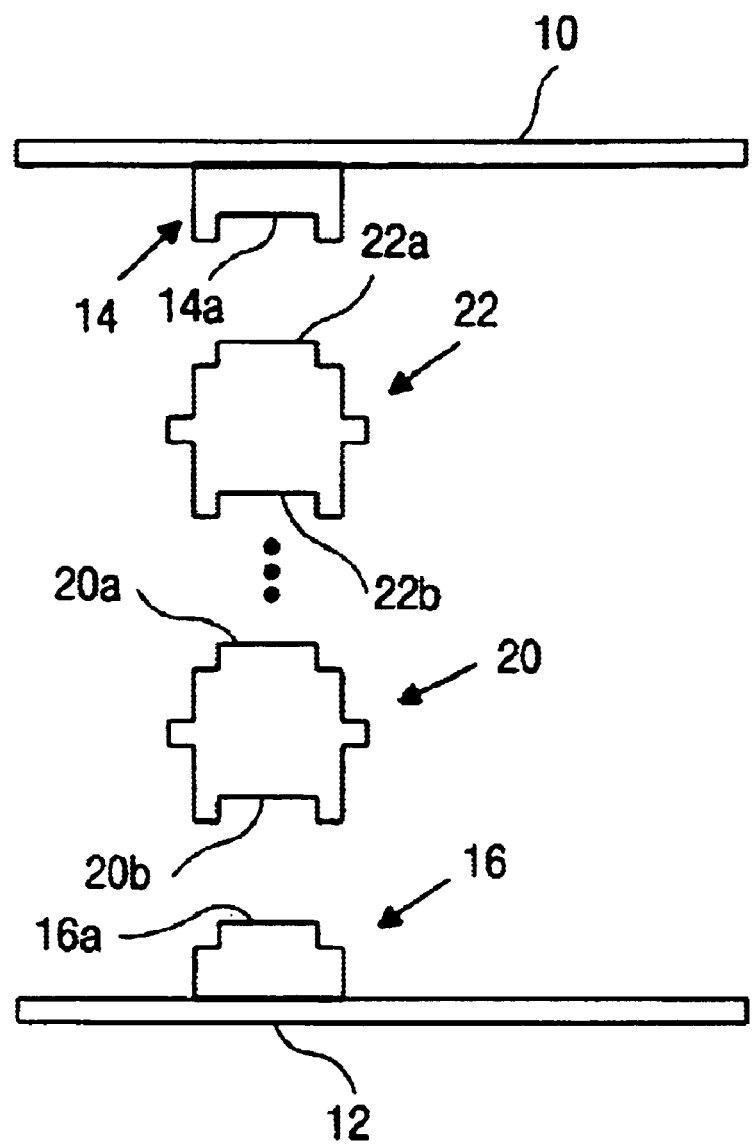
FIG. 4 is a schematic plan view illustrating connecting configuration of auxiliary connectors according to the first preferred embodiment of the present invention.

Referring now to the drawings, and more particularly to FIG. 4, a first preferred embodiment of the present invention will be described.

Figure 1:
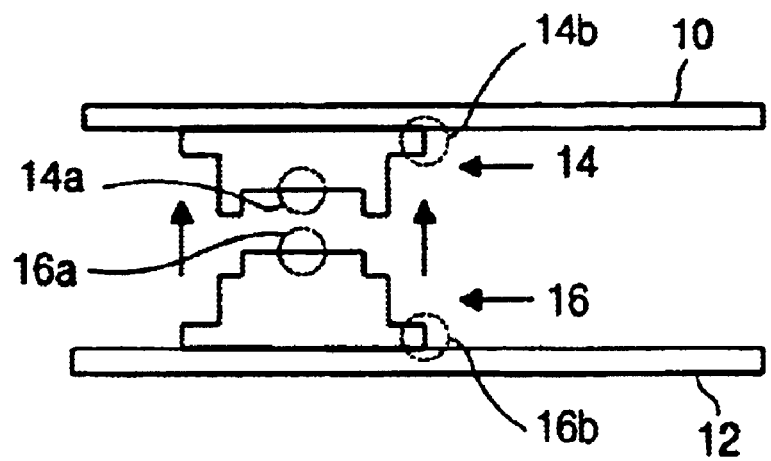
FIG. 1 is a schematic plan view illustrating connectors attached on the substrates.
Figure 2A:
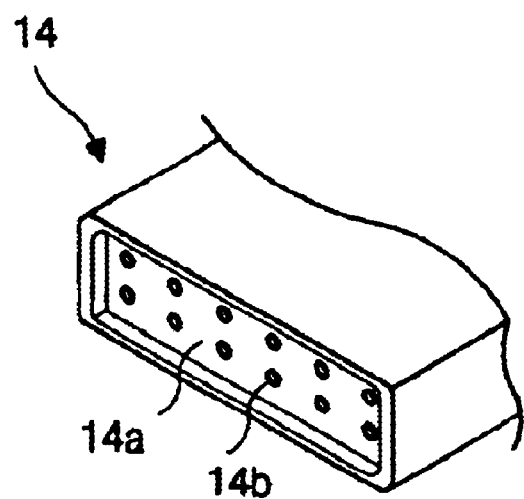
FIG. 2A is a perspective view of a concave portion and contact holes in a female connector.
Figure 2B:
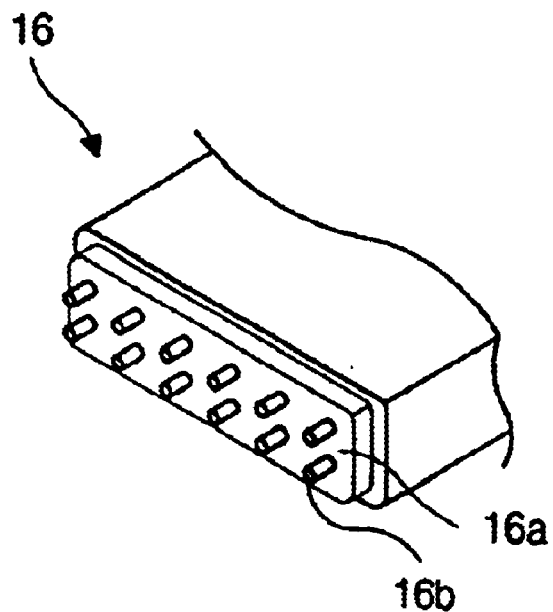
FIG. 2B is a perspective view of a convex portion and contact pins in a male connector.
Figure 3A:
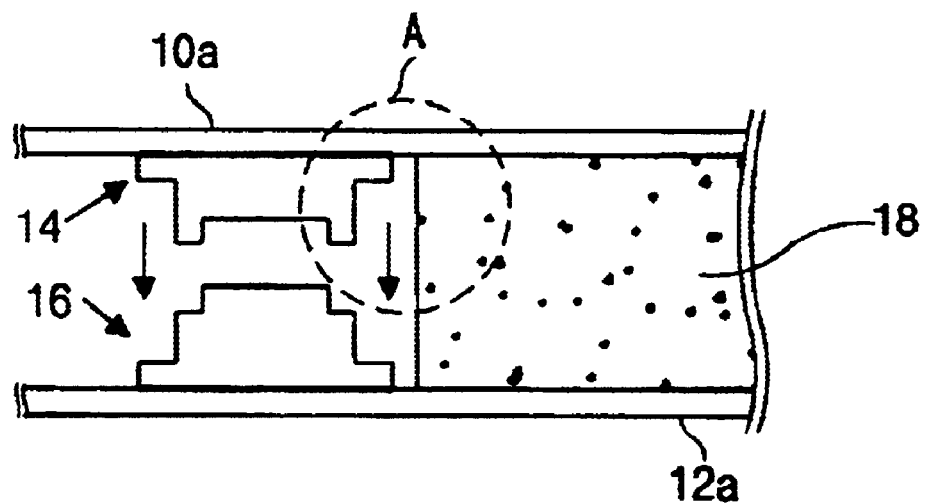
FIG. 3A is a schematic plan view explaining a problem that occurs when coupling the connectors attached on the substrates.
Figure 3B:
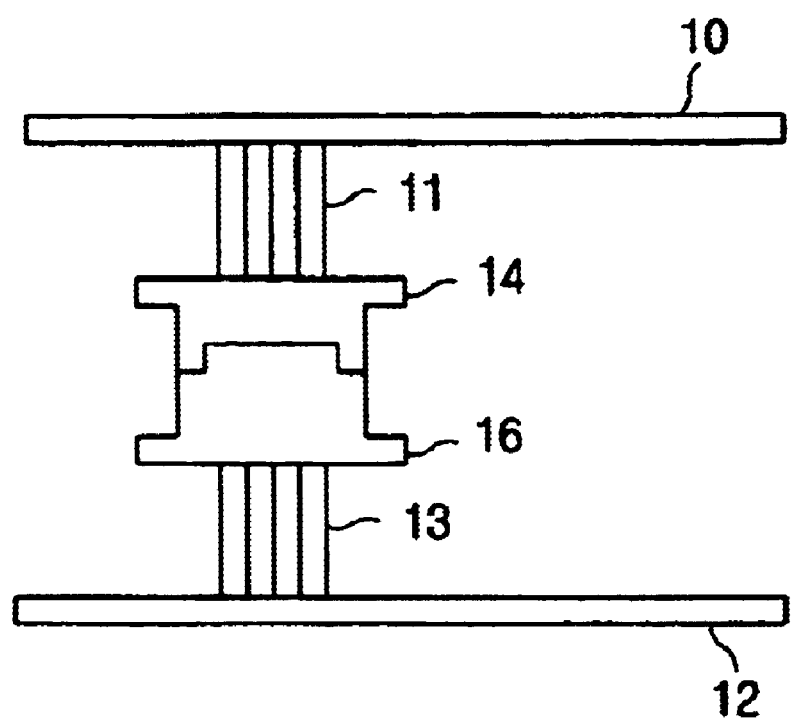
FIG. 3B is a schematic plan view illustrating conventional connector cables connecting the connectors with the substrates.

A first connector 14 having a concave portion 14a and a plurality of contact holes (shown in FIG. 2A) is attached on a patterned metal surface of a first substrate 10, and a second connector 16 having a convex portion 16a and a plurality of contact pins (shown in FIG. 2B) is attached on a patterned metal surface of a second substrate 12. Inside the first and second connectors 14 and 16, a plurality of electric wires (not shown) are arranged so that each of the contact holes and contact pins is electrically connected with the corresponding electric wire. The two connectors 14 and 16 are spaced apart from each other according to the distance between the two substrates 10 and 12.

To connect the first and second connectors 14 and 16 that are spaced apart, a plurality of auxiliary connectors, the first auxiliary connector 20 to the nth auxiliary connector 22, are employed. The first and nth auxiliary connectors 20 and 22 have concave portions 20a and 22a at one end and convex portions 20b and 22b at the other end. The concave portions 20a and 22a of the auxiliary connectors have the same structure as the concave portion 14a of the first connector 14, and the convex portions 20b and 22b of the auxiliary connectors have the same structure as the convex portion 16a of the second connector 16. Though omitted in FIG. 4, another auxiliary connectors have the same structure as the first and nth connectors 20 and 22.

Though the length of one auxiliary connector is not limited, a shorter length is preferred in order to cover various distances between the first and second substrates. Namely, if the length of the auxiliary connector is 5 centimeters (cm), the connection of the auxiliary connectors makes the multiple of 5 cm such as 5, 10, 15 cm and the like. However, if the length of the auxiliary connector is 2.5 centimeters (cm), the connection of the auxiliary connectors makes the multiple of 2.5 cm such as 2.5, 5, 7.5 cm and the like. The latter auxiliary connector having the shorter length covers more various distances between the first and second substrates.

The auxiliary connector also has a plurality of contact holes (not shown) and contact pins (not shown) on the concave and convex portions, respectively. Each of the contact holes is electrically connected with a corresponding contact pin by way of an electric wire (not shown) that is arranged inside the auxiliary connector. As the convex portion of one auxiliary connector is inserted into the concave portion of another auxiliary connector with the contact pins inserted into the contact holes, the two auxiliary connectors are connected not only physically but also electrically.

Next, referring to FIGS. 5A, 5B, and 6, a second preferred embodiment of the present invention will be described. In the second preferred embodiment, auxiliary FPC connectors connect a pair of FPC connectors clipping an open end of flexible printed circuit cables.

Figure 5A:
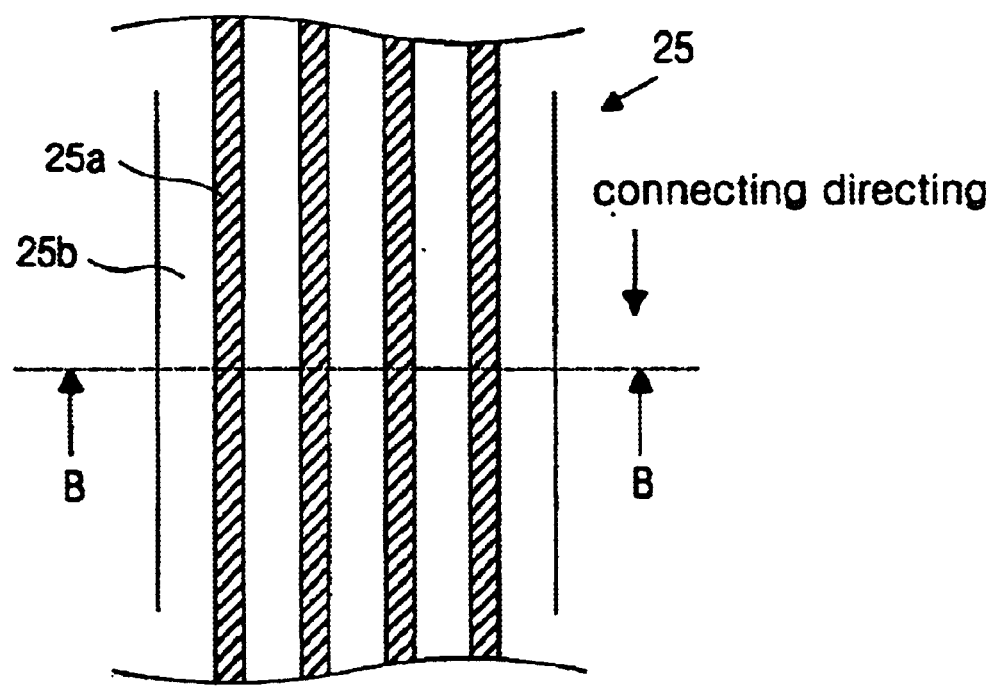
FIG. 5A is a plan view illustrating a portion of a flexible printed circuit cable.
Figure 5B:
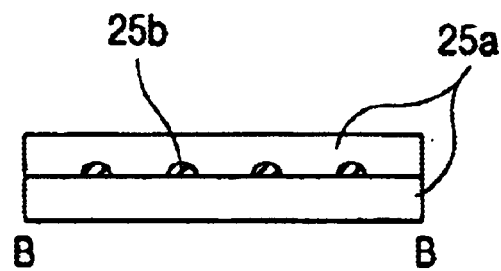
FIG. 5B is a cross-sectional view taken along the line "B—B"of FIG. 5A.

FIG. 5A shows a portion of the flexible printed circuit cable. In the flexible printed circuit cable 25, a plurality of parallel electric wires 25a are arranged spaced apart from each other, and insulating covers 25b seal the electric wires so that the electric wires are protected from breaking or short. FIG. 5B shows a cross-section of the FPC cable. Between the insulating covers 25b, a plurality of electric wires are arranged apart from each other. For connecting one FPC cable with another FPC cable, male and female FPC connectors are employed.

Figure 6:
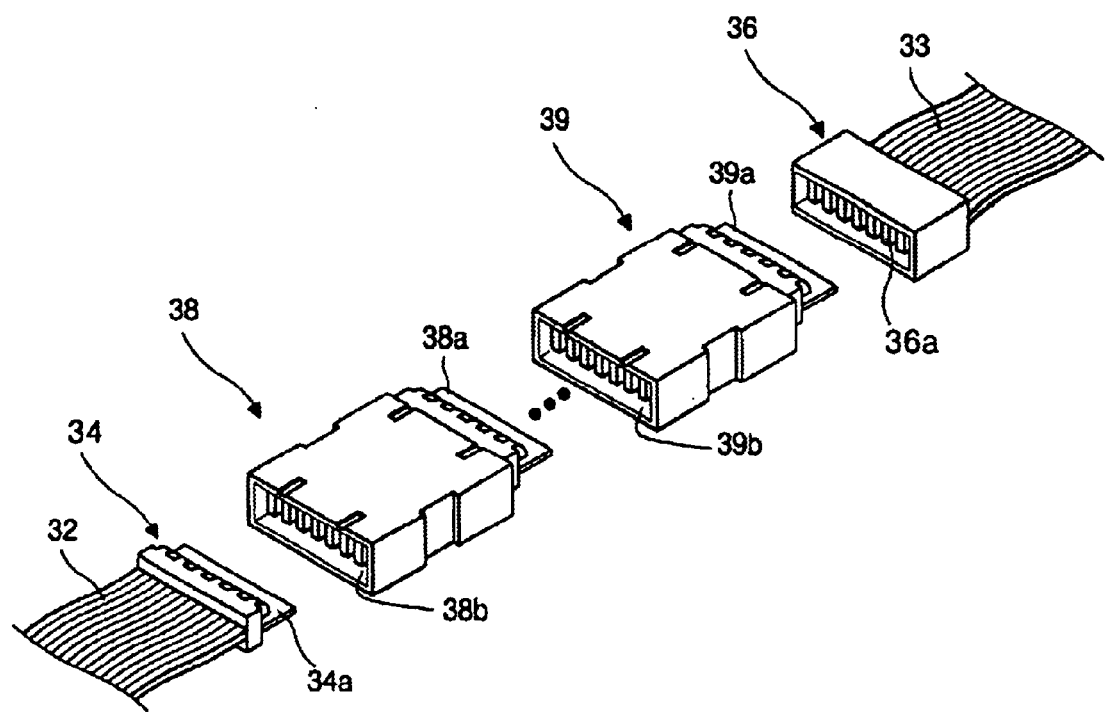
FIG. 6 is a perspective view illustrating a connecting configuration of FPC connectors and auxiliary FPC connectors according to the second preferred embodiment of the present invention.

As shown in FIG. 6, first and second FPC connectors 34 and 36 clip an open end of first and second FPC cables 32 and 33, respectively. The first FPC connector 34, a male FPC connector, has a convex portion 34a, and the second FPC connector 36, a female FPC connector, has a concave portion 36a. Since the definite length of the first and second FPC cables 32 and 33 prevent the proper coupling of the two FPC connectors 34 and 36, a plurality of auxiliary FPC connectors, a first auxiliary FPC connector 38 to a nth auxiliary FPC connector 39, are employed.

The first and nth FPC auxiliary connectors 38 and 39 have concave portions 38a and 39a at one end and convex portions 38b and 39b at the other end. The concave portions 38a and 39a of the auxiliary FPC connectors 38 and 39 have the same structure as the concave portion 36a of the second FPC connector 36, and the convex portions 38b and 39b of the auxiliary FPC connectors have the same structure as the convex portion 34a of the first FPC connector 34. That is, all of the auxiliary FPC connectors have the same structure.

Similarly to the auxiliary connector illustrated in FIG. 4, as the convex portion of one auxiliary FPC connector is inserted into the concave portion of another auxiliary FPC connector, the two auxiliary FPC connectors are connected not only physically but also electrically.

Figure 7:
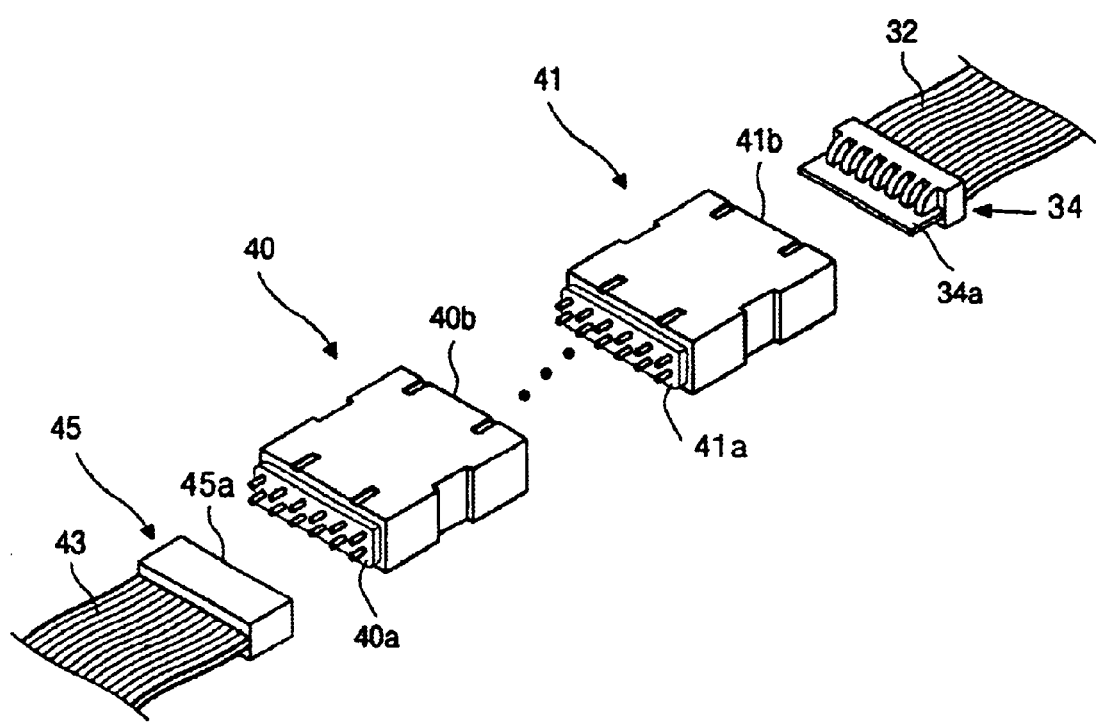
FIG. 7 is a perspective view illustrating a connecting configuration of the connector, the FPC connector, and the auxiliary connectors according to the third preferred embodiment of the present invention.

Next, referring to FIG. 7, a third preferred embodiment of the present invention will be described. In the third preferred embodiment, mixed auxiliary connectors connect a FPC connector with a cable connector.

The FPC connector 34, a male connector, clips the open end of the flexible printed cable 32, and the cable connector 45, a female connector, clips the open end of a cable 43. The cable connector 45 has the concave portion 14a and contact holes 14b illustrated in FIG. 2A.

For the sake of connecting the FPC connector 34 with the cable connector 45, a plurality of the auxiliary connectors, for example, 40 according to the first embodiment of the present invention and one mixed auxiliary connectors 41 are employed. A first end portion 41a of the mixed auxiliary connector 41 has the same structure of the convex portion 16b illustrated in FIG. 2B, and a second end portion 41b of the mixed auxiliary connector 41 has the same structure as the concave portion 36a of the second FPC connector 36 of FIG. 6. As previously explained for the first and second preferred embodiment of the present invention, the FPC connector 34, the mixed auxiliary connector 41, a plurality of auxiliary connectors 40, and the cable connector 45 are sequentially coupled to connect the FPC cable 32 and the cable 43 electrically.

A main body of the auxiliary connector, the auxiliary FPC connector, and the mixed auxiliary connector according to the preferred embodiments of the present invention are preferably made of plastics such as polyester (PET).

This detailed description is presented by way of example only. Various modifications, additions and variations of the disclosed apparatus are possible. For example, there are many ways to connect the FPC connector with the cable connector by way of the mixed auxiliary connector. Another mixed auxiliary connector having a FPC type female portion and a cable type male portion is possible in accordance with the present invention. Accordingly, the invention is to be limited only by the claims below.

What is claimed is:

1. A liquid crystal display, comprising:
   a first substrate electrically connected to a male connector;
   a second substrate electrically connected to a female connector, said second substrate disposed opposite said first substrate such that said female connector substantially aligns with said male connector and such that said male connector and said female connector are separated by a distance; and
   a plurality of auxiliary electric connectors disposed between said male connector and said female connector, wherein said plurality of auxiliary connectors electrically connect said male connector to said female connector.

2. A liquid crystal display according to claim 1, wherein said male connector has a convex portion, said female connector has a concave portion, and said auxiliary connector has a first end portion having the same shape as said convex portion of said male connector and a second end portion having the same shape as said concave portion of said female connector.

3. A liquid crystal display according to claim 1, wherein said male connector is mounted on said first substrate.

4. A liquid crystal display according to claim 1, wherein said female connector is electrically connected to said second substrate through a cable having a plurality of electric conductors.

5. A liquid crystal display according to claim 4, wherein said cable is a flexible printed connector.

6. A liquid crystal display according to claim 4, further including a liquid crystal between said first substrate and said second substrate.

7. A liquid crystal display, comprising:
   a first substrate;
   a second substrate separated by a distance from said first substrate so as to form a gap;
   a first cable having a plurality of conductors electrically connected to said first substrate;
   a male connector electrically connected to said first cable, wherein said male connector is in said gap;
   a second cable having a plurality of conductors electrically connected to said second substrate;
   a female connector electrically connected to said second cable, wherein said female connector is in said gap; and
   a plurality of auxiliary electric connectors disposed between said male connector and said female connector, wherein said plurality of auxiliary connectors electrically connect said male connector to said female connector.

8. A liquid crystal display according to claim 7, wherein said male connector has a convex portion, said female connector has a concave portion, and said auxiliary connector has a first end portion having the same shape as said convex portion of said male connector and a second end portion having the same shape as said concave portion of said female connector.

9. A liquid crystal display according to claim 7, wherein said first cable is a flexible printed connector.

10. A liquid crystal display according to claim 9, wherein said second cable is a flexible printed connector.

11. A liquid crystal display according to claim 7, further including a liquid crystal in said gap.

12. A liquid crystal display, comprising:
    a first substrate;
    a first connector arranged on the first substrate, the first connector having a first mating configuration;
    a second substrate separated from said first substrate by a predetermined distance;
    a second connector arranged on the second substrate, the second connector having a second mating configuration, the second mating configuration being different from the first mating configuration;
    a plurality of auxiliary connectors arranged between the first and second substrates, each of the plurality of auxiliary connectors being identical to one another, wherein the first and second connectors are electrically coupled to each other via the plurality of auxiliary connectors.

13. The liquid crystal display according to claim 12, wherein each of the auxiliary connectors includes a third mating configuration and a fourth mating configuration, the third mating configuration being substantially the same as the first mating configuration, the fourth mating configuration being substantially the same as the second mating configuration.

14. The liquid crystal display according to claim 12, wherein first connector is a male connector and the second connector is a female connector.

15. The liquid crystal display according to claim 12, wherein the predetermined distance is determined by a number of auxiliary connectors arranged between the first and second substrates.

16. A liquid crystal display, comprising:
    a first substrate;
    a first connector arranged on the first substrate, the first connector having a first mating configuration;
    a second substrate separated from said first substrate by a predetermined distance;
    a second connector arranged on the second substrate, the second connector having a second mating configuration incompatible with the first mating configuration; and
    at least one auxiliary connector arranged between the first and second substrates, wherein the at least one auxiliary connector electrically couples the first and second connectors, wherein the at least one auxiliary connector comprises a plurality of auxiliary connectors.

* * * * *